United States Patent
Sharma et al.

(10) Patent No.: US 10,515,180 B1
(45) Date of Patent: Dec. 24, 2019

(54) METHOD, SYSTEM, AND COMPUTER PROGRAM PRODUCT TO IMPLEMENT SNAPPING FOR AN ELECTRONIC DESIGN

(71) Applicant: Cadence Design Systems, Inc., San Jose, CA (US)

(72) Inventors: Karun Sharma, San Jose, CA (US); Henry Yu, Palo Alto, CA (US); John Hainsworth, Pittsburgh, PA (US); Kuoching Lin, Cupertino, CA (US); Jeff Taraldson, San Ramon, CA (US); Hui Xu, Wexford, PA (US)

(73) Assignee: Cadence Design Systems, Inc., San Jose, CA (US)

( * ) Notice: Subject to any disclaimer, the term of this patent is extended or adjusted under 35 U.S.C. 154(b) by 331 days.

(21) Appl. No.: 15/396,229

(22) Filed: Dec. 30, 2016

(51) Int. Cl.
  *G06F 17/50* (2006.01)
  *G06F 3/0484* (2013.01)
  *G06T 3/00* (2006.01)
  *G06T 3/60* (2006.01)

(52) U.S. Cl.
  CPC ...... *G06F 17/5081* (2013.01); *G06F 3/04845* (2013.01); *G06T 3/0081* (2013.01); *G06T 3/60* (2013.01)

(58) Field of Classification Search
  CPC .............. G06F 17/5081; G06F 3/04845; G06T 3/0081; G06T 3/60
  See application file for complete search history.

(56) References Cited

U.S. PATENT DOCUMENTS

| | | | |
|---|---|---|---|
| 6,209,123 B1 | 3/2001 | Maziasz | |
| 6,370,673 B1 * | 4/2002 | Hill | G06F 17/5072 716/123 |
| 6,557,153 B1 * | 4/2003 | Dahl | G06F 17/5068 716/120 |
| 6,823,501 B1 | 11/2004 | Dahl | |
| 7,266,796 B1 | 9/2007 | Chu | |
| 7,937,682 B2 | 5/2011 | Arunachalam | |
| 8,448,117 B2 * | 5/2013 | Dai | G06F 17/5036 716/110 |
| 8,788,998 B2 | 7/2014 | Hatamian | |
| 9,465,908 B2 | 10/2016 | Bischoff | |
| 9,690,896 B2 | 6/2017 | Seo | |
| 9,727,685 B2 | 8/2017 | Yuan | |
| 2005/0198605 A1 | 9/2005 | Knol | |
| 2007/0245281 A1 | 10/2007 | Riepe | |
| 2007/0283306 A1 | 12/2007 | Koefferlein | |
| 2009/0199142 A1 | 8/2009 | Arunachalam | |

(Continued)

OTHER PUBLICATIONS

Final Office Action dated May 17, 2018 for U.S. Appl. No. 15/396,156.

(Continued)

*Primary Examiner* — Naum Levin
(74) *Attorney, Agent, or Firm* — Vista IP Law Group, LLP

(57) ABSTRACT

Disclosed is an approach to implement snapping techniques that aid the interactive, assisted, or automatic placement of layout instances or groups of layout instances for generating a legal placement layout while reducing or entirely eliminating any subsequent or separate performance of design rule checking with respect to the relevant design rules, constraints, or requirements governing the legality of the instances or groups of instances placed in the placement layout.

22 Claims, 11 Drawing Sheets

(56) References Cited

U.S. PATENT DOCUMENTS

| | | |
|---|---|---|
| 2009/0271753 A1 | 10/2009 | Quandt |
| 2009/0307640 A1 | 12/2009 | Chapman |
| 2010/0070942 A1 | 3/2010 | Madurawe |
| 2012/0241986 A1 | 9/2012 | Sherlekar |
| 2013/0042217 A1 | 2/2013 | Heng |
| 2013/0104093 A1 | 4/2013 | Huang |
| 2014/0289695 A1 | 9/2014 | Yoshida |
| 2014/0331198 A1 | 11/2014 | Bischoff |
| 2015/0067616 A1 | 3/2015 | Hsu |
| 2017/0032073 A1 | 2/2017 | Chen |
| 2018/0144082 A1* | 5/2018 | Hanchinal ............ H01L 21/027 |

OTHER PUBLICATIONS

Final Office Action dated Aug. 8, 2018 for U.S. Appl. No. 15/396,205.
Final Office Action dated Aug. 30, 2018 for U.S. Appl. No. 15/396,178.
Non-Final Office Action dated Feb. 8, 2018 for U.S. Appl. No. 15/396,205.
Non-Final Office Action dated Mar. 9, 2018 for U.S. Appl. No. 15/396,178.
Non-Final Office Action dated Nov. 16, 2017 for U.S. Appl. No. 15/396,156.
Non-Final Office Action dated Dec. 31, 2018 for U.S. Appl. No. 15/396,229.
Non-Final Office Action dated Oct. 4, 2018 for U.S. Appl. No. 15/396,156.
Non-Final Office Action dated Jan. 10, 2019 for U.S. Appl. No. 15/396,178.
Notice of Allowance dated Mar. 5, 2019 for U.S. Appl. No. 15/396,205.
Non-Final Office Action dated Apr. 9, 2019 for U.S. Appl. No. 15/396,156.
Notice of Allowance dated Jun. 7, 2019 for U.S. Appl. No. 15/476,921.
Notice of Allowance dated Jul. 24, 2019 for U.S. Appl. No. 15/396,178.

* cited by examiner

Perform Adjustment to Grid – Find X Coordinate

METHOD, SYSTEM, AND COMPUTER PROGRAM PRODUCT TO IMPLEMENT SNAPPING FOR AN ELECTRONIC DESIGN

CROSS REFERENCE TO RELATED APPLICATIONS

This application is related to (a) U.S. patent application Ser. No. 15/396,156, entitled "METHOD, SYSTEM, AND COMPUTER PROGRAM PRODUCT FOR IMPLEMENTING PLACEMENT USING ROW TEMPLATES FOR AN ELECTRONIC DESIGN", (b) U.S. patent application Ser. No. 15/396,178, entitled "METHOD, SYSTEM, AND COMPUTER PROGRAM PRODUCT FOR IMPLEMENTING GROUP LEGAL PLACEMENT ON ROWS AND GRIDS FOR AN ELECTRONIC DESIGN", and (c) U.S. patent application Ser. No. 15/396,205, entitled "METHOD, SYSTEM, AND COMPUTER PROGRAM PRODUCT FOR IMPLEMENTING LEGAL PLACEMENT WITH CONTEXTUAL AWARENESS FOR AN ELECTRONIC DESIGN". The contents of the aforementioned U.S. patent applications are hereby incorporated by reference in their respective entireties for all purposes.

Further details regarding a system, method, and computer program product for implementing rows and row templates are described in co-pending U.S. application Ser. No. 15/396,156, entitled "METHOD, SYSTEM, AND COMPUTER PROGRAM PRODUCT FOR IMPLEMENTING PLACEMENT USING ROW TEMPLATES FOR AN ELECTRONIC DESIGN", filed on even date herewith, which is incorporated by reference in its entirety.

BACKGROUND

A graphical user interface (GUI) is a type of interface that uses graphical image elements to allow users to interact with and control a computing or electronic device. Instead of requiring a user to type commands using some form of text, the GUI control and navigation of the interface is based upon direct manipulation of graphical elements.

There are many types of computing applications that utilize graphical user interfaces to enable users to visually edit and modify the configuration of objects on a screen. For example, many types of drawing and computer aided design (CAD) tools are implemented using GUI-style interfaces. The GUI interface permits the user to visually manipulate the configuration of objects that are being drawn and displayed on the screen of a display device. In many of these GUIs, the user will select an object and can manipulate or edit the object using a pointing device such as a mouse pointer. For operations that involve moving an object, the GUI allows the user to manipulate an object by dragging and dropping the object from a first location to a second location. Dragging is commonplace in modern graphical editors and is accomplished by having the users select the object(s) they intend to move and initiate some sort of "move" command where the selected objects appear to be attached or glued to the pointer as it moves across the screen.

When presenting images of objects using a GUI, it is very helpful to the user if the visual representation displayed to the user is a close approximation of the end result of the user's actions. This correspondence between the visual representation and the actual end result is often referred to as "WYSIWYG", and is a desirable aspect of many GUI-based systems. This is because it is important to provide visual feedback to the user regarding where the objects will end up once the move operation is completed. In addition, the GUI should provide visual continuity to the user during the ghosting of the objects as the user moves the pointer across the screen. This lowers the cognitive load on the user, since the user does not have to figure out where the object will end up, as well as increasing the user's confidence in the tool.

However, problems may occur if the user commits an error or creates some sort of configuration violation when manipulating an object using the GUI. For example, in some applications, objects are not permitted to be placed into certain locations, and it is a violation if the user attempts to move an object into a space that does not permit the placement of that object in that space. Therefore, when moving an object, it is desirable to let the user to see where the objects would end up on the screen if the user completes the move operation, but the intended move operation by the user may cause the object to be moved to an impermissible location on the screen. It is desirable to let the user see, at all times, where the objects would end up on the screen if the user completes the move operation, but the problem is that the user may have moved the object to an impermissible location.

This issue is particularly problematic in the field of electronic circuit designs. Conventional electronic design processes proceed sequentially through a schematic design stage to determine the schematic design of an electronic design, a physical design stage to construct the layout of the electronic design, and a verification stage at which various verification processes, such as design rule checking and physical verification, are performed to determine whether the electronic design complies with certain set of constraints, design rules, requirements, or goals (collectively constraints). Any violations identified during the verification stage may require a costly and often time-consuming process to resolve such violations. For example, a layout designer may have to return to the physical design to move certain objects or to reroute certain interconnects in order to satisfy a spacing constraint and re-submit the revised electronic design to the verification modules or design rule check engines to determine whether the revised electronic design satisfies the prescribed constraints or constraints. As a result, the electronic design process may involve an iterative process where designers loop among various stages of the process, hoping that the electronic design may be finally signed off for tapeout. In addition, a layout designer often does not know whether any portion of the layout violates certain constraints until the layout is complete and ready for verification. The advent of more complex constraints simply exacerbates the problems. The recent advances in very deep sub-micron (VDSM) integrated circuits (ICs) have exacerbated the issues in the physical design methodology process of electronic circuits.

Therefore, what is needed is an improved approach to implement interactive placement of objects in a GUI for electronic designs, that efficiently permits automatic visualization and placement of objects in legal locations. The solution should be able to address and handle constraints that exist for modern deep-submicron design processes.

SUMMARY

Some embodiments are directed to snapping techniques that aid the interactive, assisted, or automatic placement of layout instances or groups of layout instances for generating a legal placement layout while reducing or entirely eliminating any subsequent or separate performance of design rule checking with respect to the relevant design rules, constraints, or requirements governing the legality of the instances or groups of instances placed in the placement layout.

More details of various aspects of the methods, systems, or articles of manufacture for implementing placement using row templates for an electronic design using row templates are described below with reference to the figures.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1A:
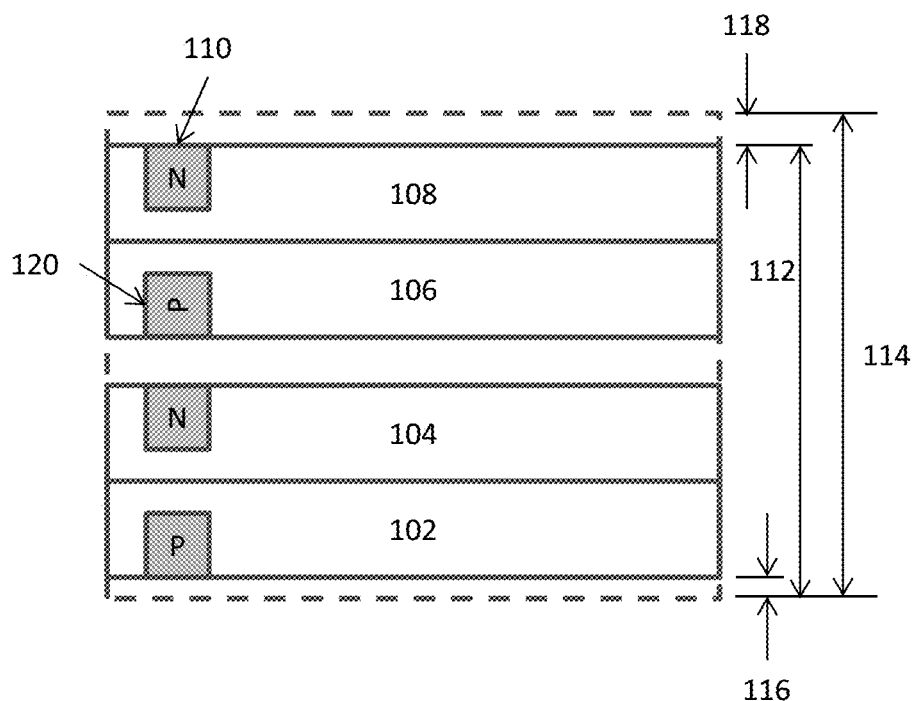
FIG. 1A illustrates a simplified example of a row template in some embodiments.

The present disclosure is directed to snapping techniques that aid the interactive, assisted, or automatic placement of layout instances or groups of layout instances for generating a legal placement layout while reducing or entirely eliminating any subsequent or separate performance of design rule checking with respect to the relevant design rules, constraints, or requirements governing the legality of the instances or groups of instances placed in the placement layout.

In some embodiments, objects for an electronic design are snapped to locations corresponding to "rows" that are logically established within the design layout. This disclosure will first provide a description of rows and row templates for electronic designs, followed by a description of one or more embodiments of a snapping process utilized in conjunction with rows.

Rows and Row Templates

This portion of the disclosure provides a description of rows and row templates according to some embodiments of the invention.

Modern integrated circuit designs allow certain specific arrangements of devices (e.g., N-P-P-N or P-N-N-P arrangements of transistors). These devices in these specific arrangements of devices may have different heights, different structures, and/or different spacing values in between. On the other hand, conventional placement tools only allow placement of standard cells having the same height. In addition, conventional approaches require intensive computational resources as well as human efforts to manually arrange devices having different height values during placement. In an example including devices having different height values, a placement tool may iterate through a plurality of processing with extensive inputs and manipulations by a designer to place these devices.

For example, a placement tool may arrange these devices in a certain pattern but subsequently find that the pattern violates certain rules or requirements and thus does not result in a legal placement layout or floorplan. Examples of such violations may include situations where the pattern is not permitted by some manufacturing requirements, a device in the pattern being placed in a prohibited orientation, and/or a device being placed in a location that does not align one or more grids (e.g., poly grids for polysilicon gates, fin grids for multi-gate devices, etc.) of the device (e.g., an instance of a cell) with the one or more corresponding grids defined for the placement layout or floorplan. Other examples of such violations may include a device being placed at a location that fails to observe the site definition (e.g., siteDEF), In addition, a device may be placed at a location in multiple orientations that all lead to legal placement of the device. These multiple legal orientations, when coupled with the aforementioned alignment or positioning requirements, further complicate the placement. For example, a device may be placed in a first orientation at a location that results in illegal placement of the device in the placement layout or floorplan. Nonetheless, the same device may be placed in a second orientation at the same location that results in legal placement of the device. In this example, the illegal placement of the device may be fixed by simply rotating the device. Nonetheless, the alignment and/or positioning of the device, when coupled with the orientation, may cause the placement tool to waste much more computational resources to repeatedly trying different placement options before finally arriving at a legal placement result.

The problems of conventional approaches with requiring intensive computation is further exacerbated when a certain arrangement of devices is repeated in a portion of the placement layout. For example, in integrated circuit designs such as memory cells, a pattern or arrangement of devices may be repeated several times to fill a region in the layout.

With the conventional approaches, an error in one pattern or arrangement needs to be fixed multiple times so that the repeated patterns or arrangements are legal.

These problems are further exacerbated in advanced technology nodes (e.g., 14 nm and below) that permit only a limited number of legal track patterns and a number of permissible width values. A legal track pattern includes a plurality of routing tracks that are associated with a permissible combination of width values. For example, the advanced technology nodes may require that a routing track associated with 34 nm width cannot be located immediately adjacent to another routing track associated with a width value of 58 nm or greater. Placement tools thus need to address not only the aforementioned complexities but also conform to the limited number of legal track patterns.

To address these challenges, row templates are employed in some embodiments to implement placement of objects within an electronic design. It shall be noted that although a row may imply a horizontal object such as in databases, the use of "row" in the present disclosure is not intended only to a horizontal object. Rather, a row may correspond to a horizontal object and/or a vertical object, and that a row template thus may include one or more horizontal or vertical rows. For example, some advance technology nodes may require that each metal layer can have interconnects in only one routing direction, and thus no bends or jogs are permitted on a metal layer. In this example, the rows and hence row templates may apply to layers corresponding to the horizontal routing direction as well as layers corresponding to the vertical routing direction.

A "row region" refers to a placement region or a place and route boundary in a layout canvas or a floorplan. An object may be created and stored in a data structure (e.g., a database) for the placement region or the place and route boundary as the row region in some embodiments. A row region may include a rectilinear shape having a plurality of vertices and boundary segments and thus may be stored in various different manners that are not intended to limit the scope of row regions. For example, a row region may be stored as a set of points each corresponding to a vertex of the rectilinear shape. As another example, a rectangular row region may be stored as a reference origin, a length value, and a width value.

A "row template" refers to a specification of the properties and/or parameters that may be applied to a row region. Applying a row template to a row region creates one or more rows in the row region and associates the one or more rows with their respective characteristics, attributes, or configuration. In some embodiments where a row is created as an object, these characteristics, attributes, or configuration may be stored in the object. In some other embodiments where a row is created as a row reference, these characteristics, attributes, or configuration may be associated with the row reference. These respective characteristics, attributes, or configuration stored in or associated with each row may be subsequently queried by placement commands to determine one or more rows and/or one or more legal locations for placing an instance to create a legal placement layout or floorplan.

FIG. 1A illustrates a simplified example of a row template in some embodiments. This simplified example of row template illustrated in FIG. 1A includes four rows—row0 102, row1 104, row2 106, and row3 108—within the template having a template height 114. Row0 is specified in the row template at the row0 offset 116 from the bottom of the row template. This row0 offset 116 may again be used to specify the offset from the top of the row template when this template is repeated in a row region. As graphically indicated by 110, each row may store or be associated with a permissible device type, permissible orientation, an alignment characteristic for devices to be placed in the row.

For example, 110 indicates that only N type devices are allowed to be placed into row3 108 in an R0 orientation (no rotation), and that the devices placed in row3 are to be aligned to the top of the row3 108 as graphically indicated by 110. As another example, 120 indicates that only P type devices are allowed to be placed into row2 106 in an R270 orientation (rotate clockwise by 270 degrees), and that the devices placed in row2 106 are to be aligned to the bottom of the row2 106 as graphically indicated by 120. The row template may also specify individual row offsets from a reference line for the rows in the row template. For example, 116 indicates row0 offset, and 112 indicates row3 offset. The spacing 118 may represent additional spacing requirement between row3 and the next immediately adjacent row as needed by, for example, the permissible devices to be placed into row3 108.

Figure 1B:
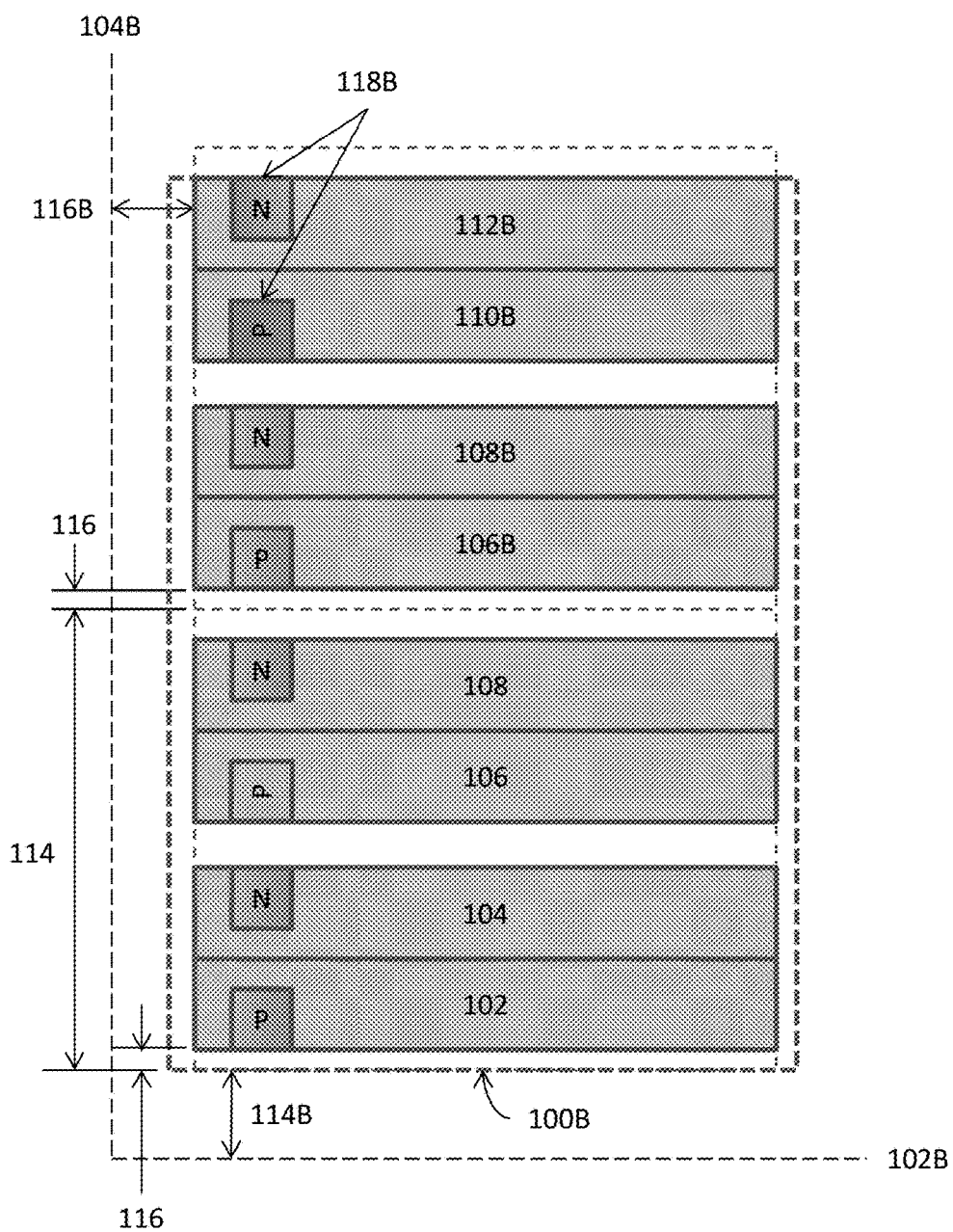
FIG. 1B illustrates an example of applying the row template of FIG. 1A to an example row region in some embodiments.

FIG. 1B illustrates an example of applying the row template of FIG. 1A to an example row region in some embodiments. In this simplified example, the row template in FIG. 1A is applied to a row region 100B that is located in a placement layout with the reference X grid 104B and reference Y grid 102B. The row region is snapped to a location that is defined by the reference Y offset 114B as well as the reference X offset 116B. The height of the row region 100B is greater than that of the row template so the row template is repeated to fill the row region 100B.

When applying the row template to the row region 100B, the first row 102 is created in the row region according to the reference X offset 116B as well as the row0 offset 116. The other three rows 104, 106, and 108 are similarly created in the row region 100B as guided by the row template. When the row template is repeated, the first row 106B is created according to, again, the row0 offset 116 and the reference X offset 116B as shown in FIG. 6B. The row template is repeated so additional rows 108B, 110B, and 112B are created according to the same row template to fill the row region 100B. It shall be noted that the graphical symbols 118B signify the permissible orientation, permissible device type, and alignment characteristics in FIG. 1B and do not represent actual devices placed into these rows.

Further details regarding a system, method, and computer program product for implementing rows and row templates are described in co-pending U.S. application Ser. No. 15/396,156, entitled "METHOD, SYSTEM, AND COMPUTER PROGRAM PRODUCT FOR IMPLEMENTING PLACEMENT USING ROW TEMPLATES FOR AN ELECTRONIC DESIGN", filed on even date herewith, which is incorporated by reference in its entirety.

Snapping

This portion of the disclosure provides a description of snapping that is used in conjunction with rows and row templates according to some embodiments of the invention.

Figure 2:
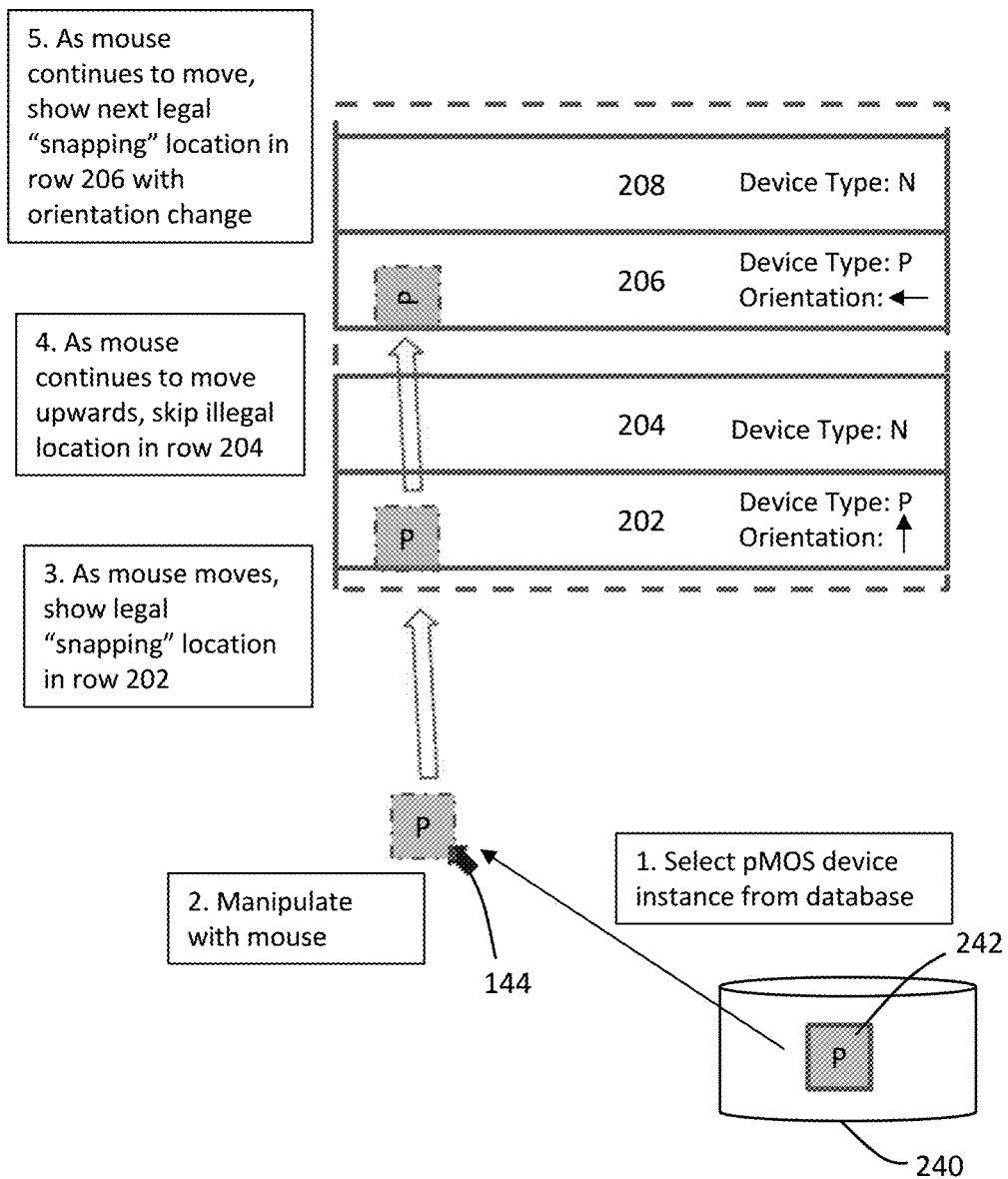
FIG. 2 shows a user interface that illustrates the snapping process according to some embodiments of the invention.

FIG. 2 shows a user interface that illustrates the snapping process according to some embodiments of the invention. The process begins when the user selects an instance of an object to be placed onto a layout. For example, the user may select an instance 242 of a pMOS device from a database 240 for placement onto a layout. Any suitable database may be used in conjunction with the invention, such as for example, an OpenAccess database.

Next, the user manipulates the object to edit or modify the configuration of the object within the layout. For example, the user may manipulate the placement or location of the object by moving the object from a first location to a second location. Any suitable control mechanism can be used to manipulate the object. As just one example, the user may use a mouse pointer 144 to select the object, and while the object is selected, to shift the object from one location to another. It is noted, however, that other control mechanism may also be employed to manipulate the object. For example, keyboard controls and menu mechanisms may be used to manipulate the object configuration.

As the mouse is manipulated, the location of the object will correspondingly shift within the layout. Since the user may freely manipulate the movement of the mouse, the mouse coordinate may end up at any location within the layout. The issue is that, at any moment in time, the exact location of the mouse may correspond to a location that is not permissible for placement of the object.

To address this issue, some embodiments permit the location of the object to be automatically "snapped" or shifted to an appropriate location on the layout, where the snapped location may differ from the current location of the mouse pointer. The system processes the current location of the mouse coordinates and the parameters of the rows that have been configured for nearby row regions, and will then determine an appropriate "legal" location for the object. From a visual perspective, the object will be made visible at that snapped location.

In the current example, as the mouse is moved towards row 202, the object is shown as being "snapped" to a suitable location with that row. This row is a permissible location for the object since there is a match between the device type for the object (pMOS device) and the configured allowable device type for that row (which is also the pMOS device type). Within the row 202, there may be specific alignment, orientation, and/or offset requirements for placement of the object. The snapping process will automatically consider those requirements, and will adjust the snapped location/orientation accordingly, as well as providing visual feedback for those manipulations.

If the user continues to move the mouse across the screen, it is possible that the mouse will be moved over rows that are inappropriate for the object. For example, row 204 is not a permissible location for the object since there is a mismatch between the device type for the object (pMOS device) and the configured allowable device type for that row (which is the nMOS device type). In this situation, the movement of the mouse will not cause any snapping to a location within row 204. Instead, when the mouse pointer movement location is over this row, in some embodiments, this causes the object to not appear visible during that time period. Alternatively snapping may cause the object to visually stay with the last legal location and/or jump to the next legal location.

As the mouse continues to move upwards towards row 206, the object is then snapped to a suitable location with that row. This row is a permissible location for the object since there is a match between the device type for the object (pMOS device) and the configured allowable device type for that row (which is also the pMOS device type). As previously noted, within the row, there may be specific alignment, orientation, and/or offset requirements for placement of the object. The snapping process will automatically consider those requirements, and adjust the snapped location/orientation accordingly, and provide visual feedback or those manipulations. For example, the row may be configured to require a certain orientation, which is satisfied by changing the orientation of the object, and where the visualization of the object in the interface is configured to show that change in orientation.

This approach therefore provides immediate visual feedback to the user regarding where the objects is permissibly allowed to end up once the move operation is completed, without requiring the user to precisely (and manually) placing the object into that exact legal location. This approach also allows the user to very quickly, in an interactive way, move a large number of objects into allowable locations that will not violate design rules—since the user merely needs to move the pointer to an approximate location, and the system will then carry on to identify a nearby location that is suitable for placement of the object.

Figure 3:
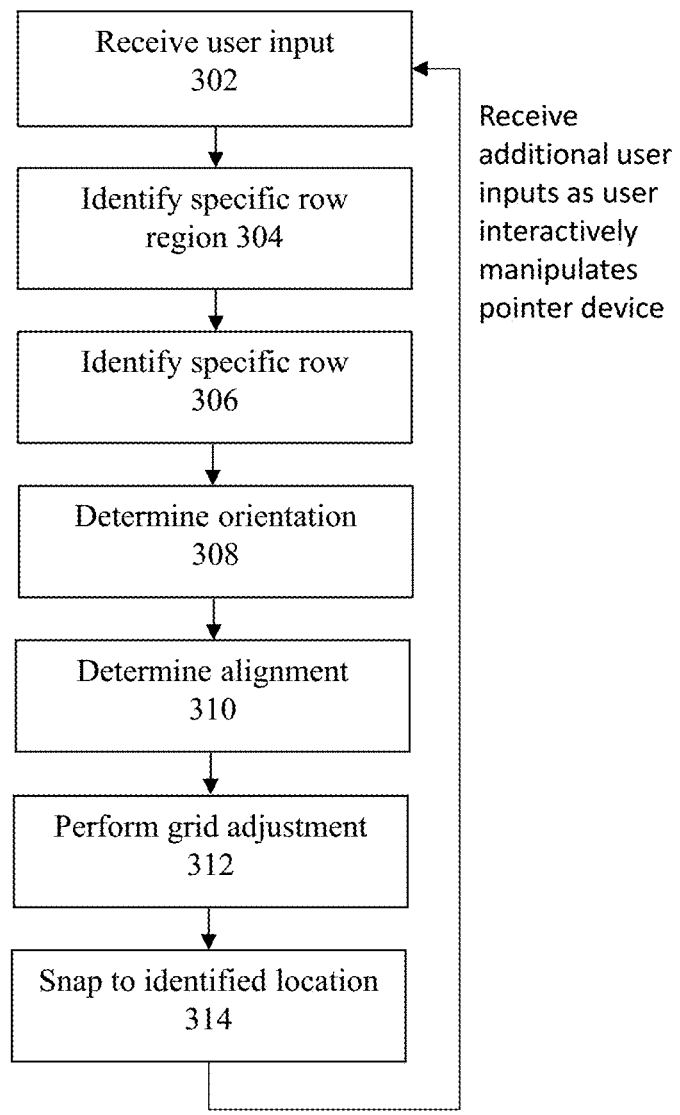
FIG. 3 illustrates a high level flowchart of a process to implementing snapping for an electronic design according to some embodiments of the invention.

FIG. 3 illustrates a high level flowchart of a process to implement snapping for an electronic design according to some embodiments of the invention. At 302, user inputs are received for selection of an object to move, as well as movement of the selected object. As noted above, any suitable control mechanism can be used to manipulate the object. For example, the user may use a mouse pointer to select the object, and while the object is selected, to shift the object from one location to another. Other control mechanism may also be employed as well to manipulate the object, e.g., keyboard controls and menu mechanisms.

At 304, a specific row region is identified with respect to the object. The design layout may include any number of different row regions that have been defined by the appropriate row templates. This action is taken to identify one of the row regions from among the number of row regions for snapping. Further details regarding an approach to implement this action according to some embodiments is described in conjunction with FIG. 4.

At 306, a specific row from within the row region is identified for the snapping process. A row region may include any number of rows, where only certain of the rows are appropriate for placement of the object. This action is taken to identify one of the rows where snapping will occur for the object. Further details regarding an approach to implement this action according to some embodiments is described in conjunction with FIG. 5.

At 308, orientation is determined for the object within the selected row. As previously noted, a row may be defined to require a certain orientation for objects placed within that row. This action is taken to ensure that the object is configured to have the appropriate orientation required for placement within the row. Further details regarding an approach to implement this action according to some embodiments is described in conjunction with FIG. 6.

At 310, an alignment action may be taken to align the object to a position along the "Y" axis. Further details regarding an approach to implement this action according to some embodiments is described in conjunction with FIG. 7.

In addition, at 312, an adjustment may be performed to align the object to one or more grids, e.g., to move the object to a certain position on the "X" axis. Further details regarding an approach to implement this action according to some embodiments is described in conjunction with FIG. 8.

Thereafter, at 314, the object is then snapped to the identified location. This action may involve a change to the user interface to reflect the movement of a visual representation of the object to the identified location.

Figure 4:
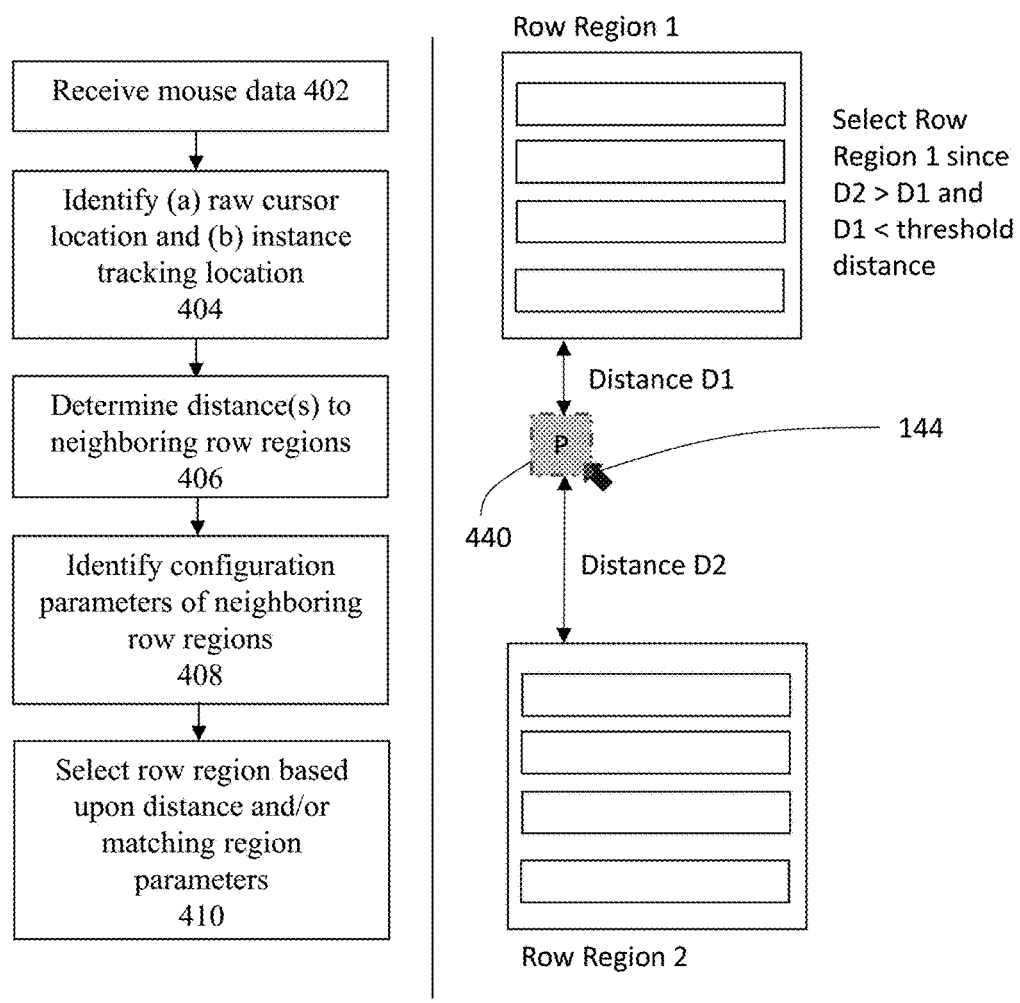
FIG. 4 provides a more detailed flowchart along with an illustration of the process for selecting a row region for snapping according to some embodiments of the invention.

FIG. 4 provides a more detailed flowchart along with an illustration of the process for selecting a row region for snapping according to some embodiments of the invention. The process begins at 402 with the receipt of data with regards to the user inputs, e.g., data from manipulation of a mouse pointer. For example, from an interactive point of view, the user may have pointed to an instance of an object on the user interface screen (e.g., a pMOS device, nMOS device, or a standard cell), and then performed an action to select that object instance. At this point, the object processing may have engaged into a specific "mode" of operation, e.g., a "move" command to engage in a "real time move".

Internally, one or more data structures may be configured to implement the move command processing. For example, a data structure may be employed to represent the temporal version of the object from the database during the move command processing. This temporal structure essentially provides a scratchpad for the intermediate processing that occurs to identify the eventual location for that object within the layout.

At 404, tracking is performed for the raw cursor location from the user's manipulation of the mouse pointer. In addition, tracking is performed of the location of the instance that is being moved around. It is noted that at any particular moment in time, the raw cursor location may or may not correlate exactly with the instance tracking location. This is because the mouse may be moved at any location on the user interface screen, while there may be certain locations at which the object instance is not permitted to be placed, and hence a discrepancy arises between those two tracking locations. For example, when the cursor moves into an area that is illegal for placement of the object, then the object instance may be represented at a legal placement location that is different from the current cursor location.

At this point, the raw cursor location is reviewed and analysis is performed to identify a specific row region that is appropriate for the current cursor location. To that end, at 406, distances are identified from the tracking location to the neighboring row regions. In addition, at 408, the configuration parameters are identified for those neighboring row regions. For example, the row templates are reviewed to identify the characteristics and properties of the neighboring row regions.

At 410, a row region from among one or more possible row regions is selected using at least the distance from the tracking location to the row region(s), and/or along with consideration of whether or not properties/characteristics requirements of the row regions match the object being placed. In particular, a threshold distance may be established to identify a row region that would be appropriate for snapping, where the object is snapped to the row region if it falls within the threshold distance. In addition, if there are multiple row regions having distances that fall within the threshold distance, then an arbitration process can be performed to select the most appropriate row region, e.g., by selecting the nearest row region. The configuration of the row region may also play a part in the selection process, e.g., where the row region is configured to only permit placement of objects having certain properties or parameters, and the row region is excluded from consideration when the object being moved does not meet those requirements.

The right-hand portion of FIG. 4 provides an illustration of this process. This figure shows an object instance 440 being manipulated using a mouse pointer 144. At its current tracking location, there are two neighboring row regions—row region 1 and row region 2. The distances are calculated between the tracking location and each of these row regions. Here, the distance from the tracking location for object 440 to row region 1 is D1 and the distance from the tracking location to row region 2 is D2.

A determination is made whether any of these distances fall within the threshold snapping distance. Here, for the purpose of illustration, assume that both distances D1 and D2 fall within the threshold snapping distance. In addition, for illustration purposes, it is further assumed that the configurations for both these row regions permit placement of the object. Therefore, both row regions are eligible to be selected for snapping purposes. However, since there are multiple eligible row regions, a selection process is employed to pick one of the two row regions for snapping purposes. In some embodiments, the eligible row region having the closest distance could be selected as the row region for snapping purposes. In the current example, this means that row region 1 is selected since its distance to the tracking location D1 is less than the distance D2 from the other row region 2 to the tracking location.

Figure 5:
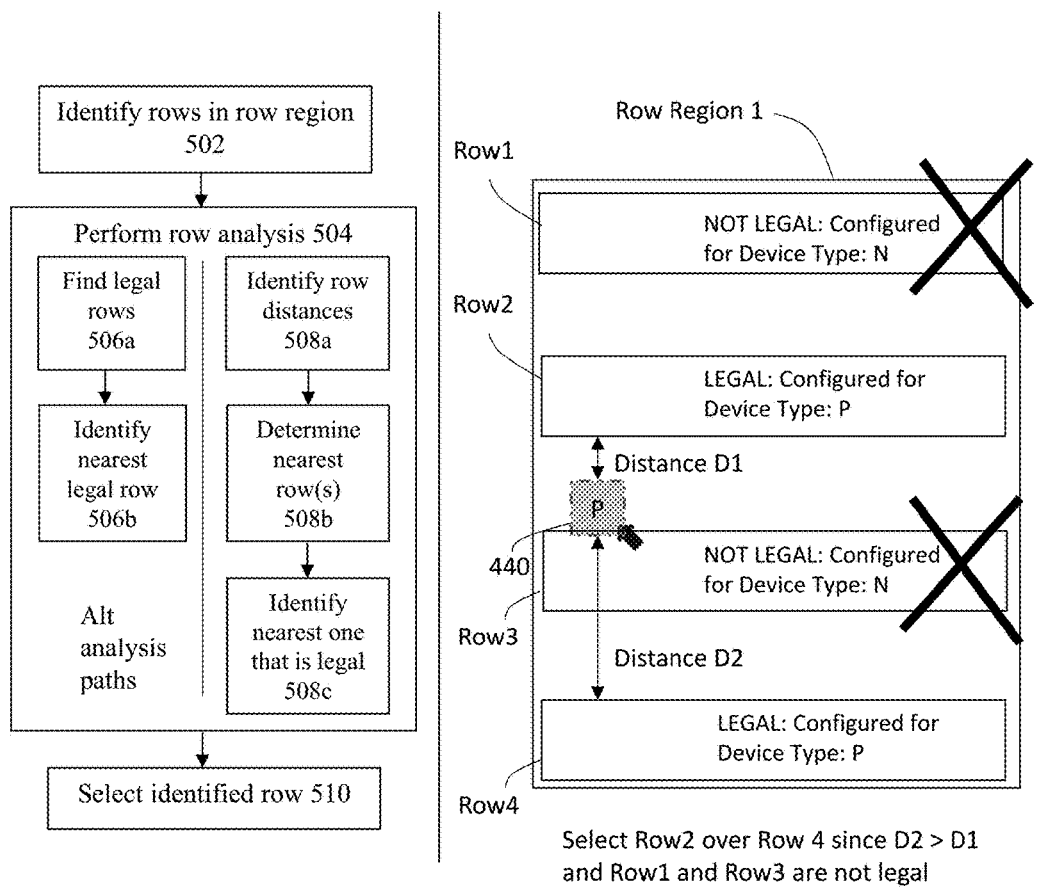
FIG. 5 provides a detailed flowchart along with an illustration of the process for selecting a specific row from within a row region according to some embodiments of the invention.

FIG. 5 provides a detailed flowchart along with an illustration of the process for selecting a specific row from within a row region according to some embodiments of the invention. The process begins at 502 by identifying the one or more rows in the selected row region, and/or along with the characteristics/properties of those rows. The applicable row template for the row region may be reviewed to identify the specification of the configurations, characteristics, or attributes some of which may be pertaining to specific rows in the row region. For example, identification may be made of a specific device type that is configured to be permissible within each of the rows, e.g., such as N-type metal oxide semiconductor or nMOS devices and/or P-type metal oxide semiconductor or pMOS devices.

The characteristics of the rows may be matched up against the characteristics of the instance to determine which of the rows is appropriate for snapping of the object. For example, the one or more characteristics of the instance to be considered may include, e.g., the type of the instance (e.g., nMOS, pMOS, a multigate device, etc.), one or more grids (e.g., poly grids, fin grids, etc.) inside the instance, connectivity information (e.g., identifiers and locations of pins, pads, terminals, etc.), or any other characteristics that may be referenced by a placement module in placing the instance into a layout.

At 504, row analysis is performed to identify the closest row to the current tracking location that is applicable to the object instance being moved. There are numerous different operation sequences that may be performed to filter out inappropriate rows and to identify the rows having characteristics that are applicable to the instance being placed.

In one possible sequence, at 506a, the process first identifies the legal rows for placement of the instance, e.g., by identifying rows that are configured for the specific device type (e.g., nMOS or pMOS device) of the instance being placed. This action creates an initial filter that filters out the rows which are not applicable to the instance. Next, at 506b, the nearest legal row by distance is then identified as the selected row for snapping purposes.

In an alternate possible sequence, at 508a, instead of first filtering the inappropriate rows, the process instead begins by identifying the distances from the current tracking location to the different rows, and at 508b then identifies the nearest row(s). At 508c, the characteristics of the nearest row(s) are considered, where the nearest row that can legally take the object is identified.

Under either approach, once the nearest legal row has been identified, then at 510, that identified row is selected for snapping.

The right-hand portion of FIG. 5 provides an illustration of this process. This figure shows an object instance 440 being manipulated using a mouse pointer. Within the current row region, there are four rows—row1, row2, row3, and row4. Each of these rows are assigned to a legal component type, due to the configuration of these rows from their corresponding row template. Analysis is performed to make sure the object 440 will match the legal component type of the selected snapping row.

Here, the object 440 being moved is an instance of a pMOS device. In reviewing the configuration for each of the rows, it can be seen that row1 and row3 both are configured to accept nMOS devices—and not pMOS devices. Therefore, there is a mismatch between the type of device for the object being moved and the configuration for row1 and row3. As such, these rows can be filtered from consideration.

In addition, it can be seen that row2 and row4 are both configured to accept pMOS devices—which matches the component type of the object 440 being moved. Therefore, both rows are eligible to be selected for snapping purposes. However, since there are multiple eligible rows, a selection process is employed to pick one of the two rows for snapping purposes. In some embodiments, the eligible row having the closest distance could be selected as the row for snapping purposes. In the current example, this means that row2 is selected over row4 since row2's distance D1 to the tracking location is less than the distance D2 from row4 to the tracking location.

Figure 6:
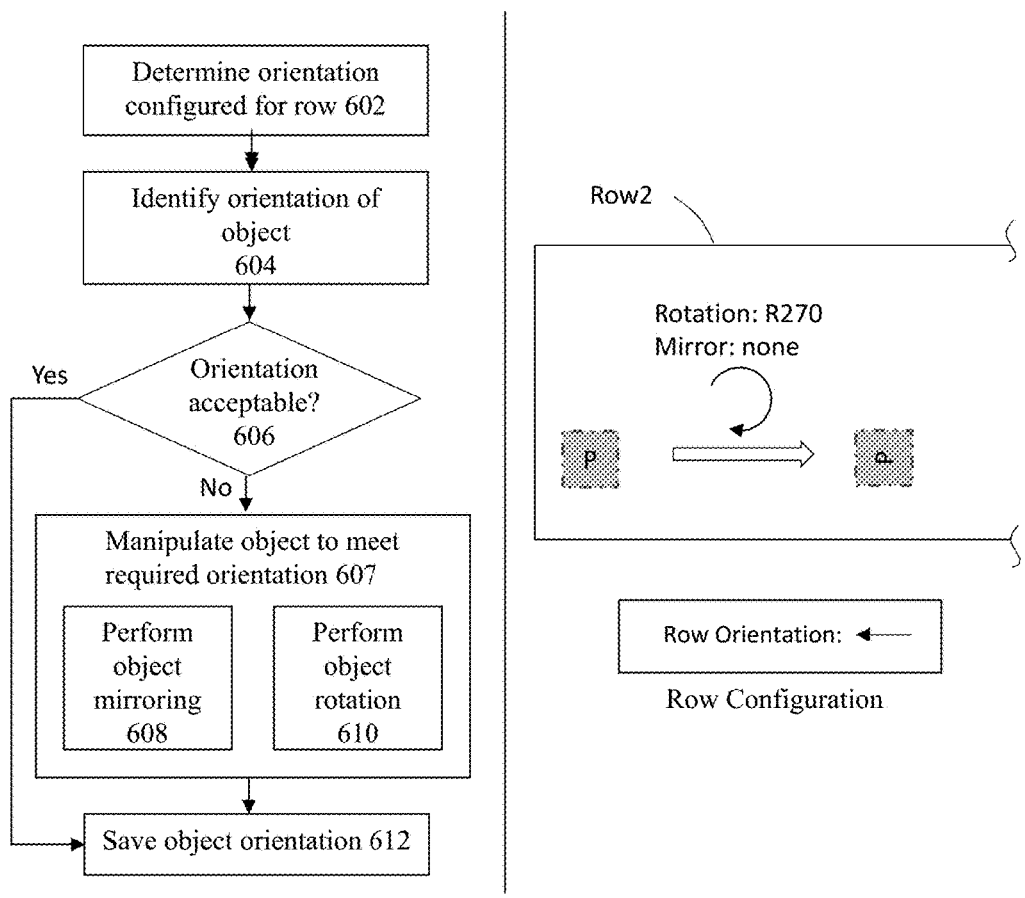
FIG. 6 provides a detailed flowchart along with an illustration of the process for determining object orientation within the selected row according to some embodiments of the invention.

FIG. 6 provides a detailed flowchart along with an illustration of the process for determining object orientation within the selected row according to some embodiments of the invention. Since a device may be placed at a location in multiple orientations, these multiple legal orientations (when coupled with alignment or positioning requirements discussed further below) further complicate the placement of the object being moved. For example, a device may be placed in a first orientation at a location that results in illegal placement of the device in the placement layout or floorplan. Nonetheless, the same device may be placed in a second orientation at the same location that results in legal placement of the device.

To address this issue, at 602, the process determines the orientation requirements for objects placed within the row. The applicable row template for the row region may be reviewed to identify the specification of the configurations, characteristics, or attributes for the row, which serve to provide information pertaining to orientation requirements for the row. The one or more permissible orientations for a row may include, for example, horizontal, vertical, rotating by 0-degree (R0), 90-degree (R90), 180-degree (R180), or 270-degree (R270), mirroring against the reference X grid (MX), mirroring against the reference Y grid (MY), etc. of a circuit component or device when placed in a specific row. It should be noted that the same circuit component or device may have identical or different orientation(s) when placed in different rows.

At 604, the current orientation of the object instance being moved is identified. At 606, the object orientation is manipulated to meet the required orientation for the row. For example, object mirroring may be performed at 608, e.g., by mirroring along either the X axis or the Y axis. In addition, object rotation may be performed at 610 at any suitable rotation angle. The revised orientation configuration for the object is then saved to the temporal data structure for the object at 612.

In some embodiments, rotation by 90 degrees or 270 degrees may not be permitted in a row region for one or more device types. For example, some advanced technology nodes permit the fins of multi-gate devices (e.g., FinFET) only in the horizontal orientation and the polysilicon grids only in the vertical orientation. In these embodiments, the fin grid will be set up in a row region only in the horizontal routing direction, and the polysilicon grid will be configured only in the vertical routing direction. Moreover, any rows in the row region for placing these one or more device types will not store or will not be associated with the legal orientation of R90 or R270.

In some other embodiments, rotation by 90 or 270 degrees may be permitted in a row region for one or more device types. In these embodiments, pertinent grids (e.g., Fin grids, polysilicon grids, etc.) will be set up in both the horizontal and vertical routing direction for proper snapping or alignment of instances in the row region. Moreover, a permissible row for an instance will now store or will be associated with the legal orientation or R90 and/or R270.

The right-hand portion of FIG. 6 provides an illustration of the above-described process. Here, the row configuration for the row indicates that the required orientation for the row is 270-degree (R270). However, the current orientation of the object is at 0-degree. Therefore, the object is rotated by 270 degrees to attain a match between the object orientation and the configured requirements for the row.

Figure 7:
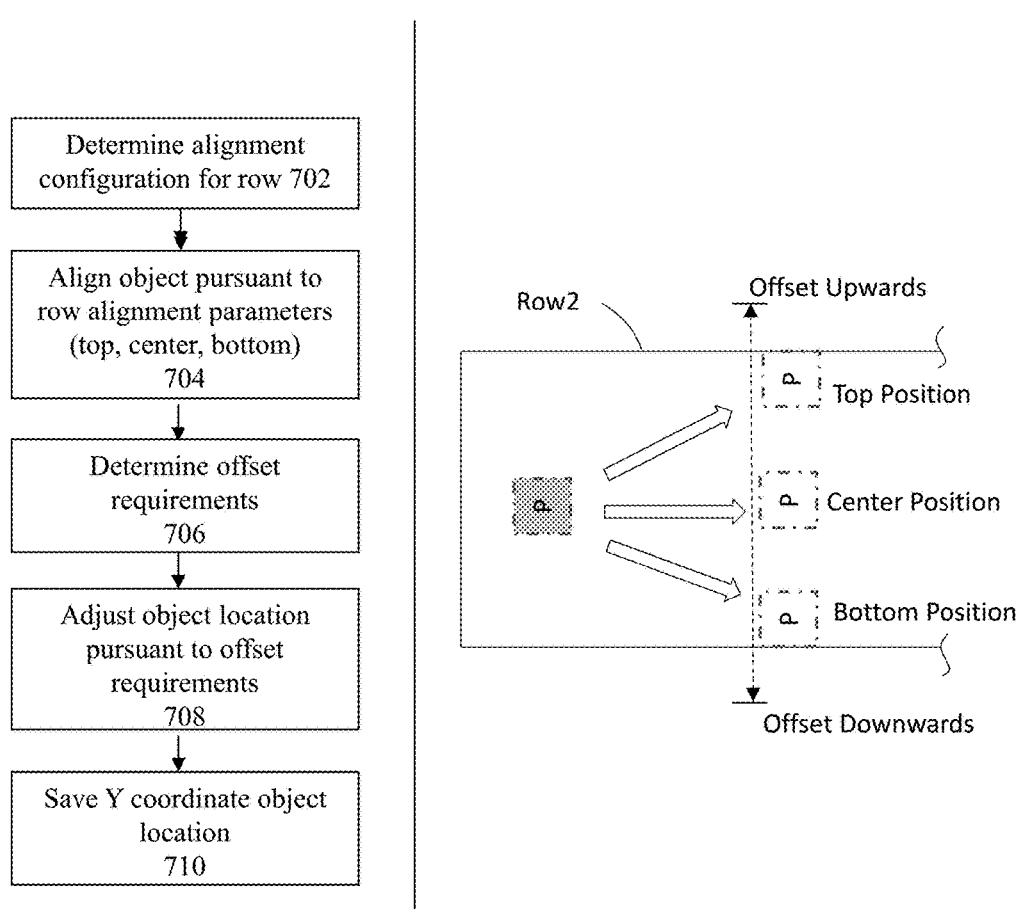
FIG. 7 provides a detailed flowchart along with an illustration of the process for performing object alignment.

FIG. 7 provides a detailed flowchart along with an illustration of the process for performing object alignment, e.g., to determine a Y coordinate for the object, according to some embodiments of the invention. This process is performed to conform the object placement to any requirements that are configured with respect to alignment references for the row (e.g., aligned to the top, to the bottom, or to the center of the row). In addition, consideration is taken of any possible positive or negative alignment offsets that are required for instances within the row. By way of illustration, a background layer may include alignment information for bottom aligned rail (e.g., Vss) with a given rail width having an alignment offset from the bottom boundary segment of the background layer. The background layer may also include alignment information for a top aligned rail (e.g., Vdd) with a given rail width with an alignment offset from the top boundary segment of the background layer. The background layer may also include alignment information for a center aligned rail with respective to a reference centerline segment of the background layer.

At 702, the characteristics of the row with regards to alignment are identified, e.g., where the applicable row template for the row region is reviewed to identify the specification of the configurations, characteristics, or attributes for the row. For example, the row may be configured with a requirement for one of (a) top, (b) bottom, or (c) center alignment options for certain types of objects placed within the row. Therefore, at 704, the object is aligned pursuant to one of the required alignment parameters.

Next, at 706, a determination is made whether there is an additional alignment offset requirement for the row that need to be addressed, e.g., with respect to connectivity information of one or more rails (such as Vdd rails, Vss rails, etc.) and a positive or negative alignment offsets for one or more rails of the row. If so, then at 708, the object location is adjusted pursuant to the alignment offset requirements. Thereafter, at 710, the Y-coordinate information for the object location is saved.

The right-hand portion of FIG. 7 provides an illustration of this process. Here, the figure shows that the object may be placed at any of the top, center, or bottom alignment locations. In addition, an alignment offset maybe applied to shift the object either upwards or downwards.

Figure 8:
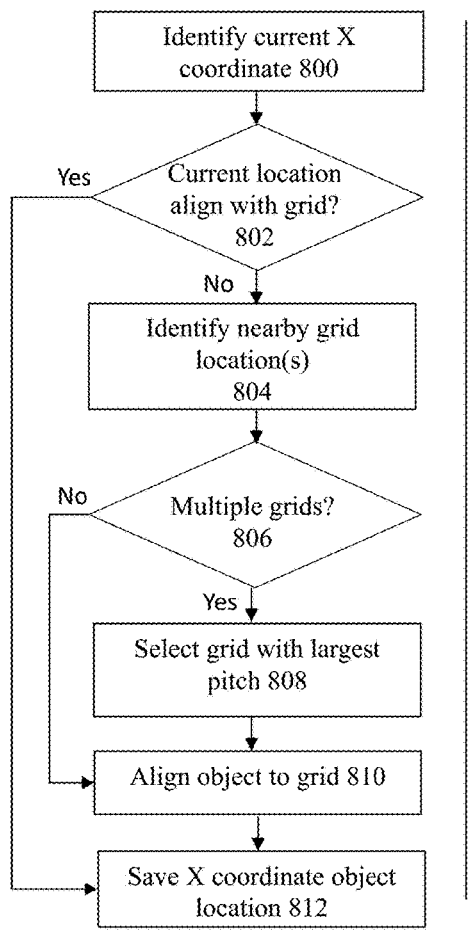
FIG. 8 provides a detailed flowchart along with an illustration of the process for performing an object location adjustment according to one or more grids.
Figure 8:
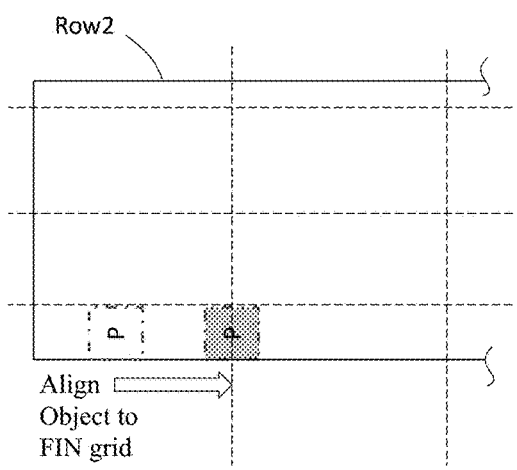

FIG. 8 provides a detailed flowchart along with an illustration of the process for performing an object location adjustment according to one or more grids, e.g., to determine an X coordinate for the object, according to some embodiments of the invention. The reason for taking this action is to address possible design violations that violate certain manufacturing requirements, such as a device being placed in a location that does not align to one or more grids (e.g., poly grids for polysilicon gates, fin grids for multi-gate devices, etc.) of the device (e.g., an instance of a cell) with the one or more corresponding grids defined for the placement layout or floorplan.

At 800, the current location of the object is reviewed, and at 802, a determination is made whether the object location is in alignment as required with one or more reference grids.

A reference grid may be identified from the manufacturing grids that are often provided by the manufacturers (e.g., a foundry) and comprise both horizontal and vertical grids at a small spacing value (e.g., 1 or 2 nanometers) and may be used to position various entities (e.g., rows, layout circuit component designs, layout devices, cells, blocks, etc.) in a layout. In some embodiments, a reference grid in the horizontal direction (Y grid) and a reference grid in the vertical direction (X grid) may be identified.

The reference grid may include a set of parallel reference lines or line segments at a spacing value that is larger than that of the manufacturing grids. An intersection of the reference X and reference Y grids may be identified as the relative origin for the placement region or place and route boundary. The reference X grid and reference Y grid may be independently identified from the manufacturing grids in some embodiments or may be identified from one or more sets of grids that may also be provided by the manufacturers in some other embodiments. For example, an integrated circuit or IC manufacturer may provide a fin grid for multigate MOSFET (metal-oxide-semiconductor field-effect transistor) such as a FinFET (Fin Field Effect Transistor) or other non-planar or three-dimensional transistors, a poly grid for aligning polysilicon gates, a global fin grid, a global poly grid, etc. in one or both routing directions. The reference X grid and reference Y grid may be identified from one or more of the aforementioned grids in some embodiments.

If the current object location does not properly align to a required grid, then at 804, identification is made of nearby grid locations that the object may snap to. For example, snapping may occur to the origin of the reference grids or to another intersection between the reference grids.

It is possible that multiple grids are applicable to the snapping process. Therefore, at 806, a determination is made whether there are multiple grids that need to be considered. For example, snapping may occur to either/both SP (spacing pattern) and WSP (width spacing pattern) grids. In this situation, if there are multiple applicable grids, then a determination is made at 808 as to which of the multiple grids should be selected for snapping purposes. In some embodiments, the grid having the largest pitch size is selected. It is noted that the instance pitch may also be considered during this process. Therefore, at 810, the object is aligned to the selected grid location, e.g., by shifting the object along the X axis to a selected X coordinate location. Thereafter, at 812, the X-coordinate information for the object location is saved.

The right-hand portion of FIG. 8 provides an illustration of this process. Here, the figure shows a grid that is applicable to the layout, e.g., a fin grid for multigate MOSFET components such as FinFET devices. In this situation, the object is aligned to the grid, e.g., by shifting the object location along the X axis to a new X coordinate location.

These processes are performed to implement electronic circuit designs with snapping techniques that aid the interactive, assisted, or automatic placement of layout instances or groups of layout instances for generating a legal placement layout while reducing or entirely eliminating any subsequent or separate performance of design rule checking with respect to the relevant design rules, constraints, or requirements governing the legality of the instances or groups of instances placed in the placement layout.

In some embodiments, an instance or a group of instances (collectively instance) that is to be placed in a layout may be identified, where the layout includes one or more row regions each comprising one or more rows into which instances may be placed. A hierarchical data structure may be created to store the hierarchical information including information about a row region, information about one or more rows in the row region, etc.

In the case of an interactive placement of the instance where a user drags to move the instance in the layout, a separate data structure may be further created in a volatile memory (e.g., dynamic random memory) to represent one or more temporary versions of the instance being moved, while the original instance may remain at its original location with the same or different graphical representation schemes (e.g., a temporary version may be graphically emphasized or de-emphasized in the graphical user interface). Moreover, the cursor locations may be captured at a predetermined frequency to indicate the intended location(s) of the move of the instance during interactive placement. A track location may also be determined while the instance is being moved in real-time.

A placement-aware module may be invoked to identify one or more row regions for placing the instance. Depending on where the tracking location is, a snapping module may automatically snap a temporary version of the instance to a legal position while accounting various rules, constraints, or requirements pertaining to the legality of placement. For example, where a temporary version is outside a row region by a certain distance but still within the graphical window of the user interface or within the IC chip boundary, the snapping module may determine whether the instance is to be snapped to a row region.

In some situations where a temporary instance is within a configurable threshold distance from a row region (e.g., the closest row region for the temporary instance), the snapping module may snap the temporary version of the instance to one or more legal rows in the row region. It shall be noted that a row may be defined to allow one or more specific component types as well as certain requirements concerning the alignment, orientation, offset, etc. of instances that may be accommodated in the row.

In identifying the one or more legal rows for snapping the instance, the snapping module accounts for such requirements, rules, and constraints so that the instance, when placed at an automatically snapped location, is legally placed in the one or more legal rows. In some embodiments, the snapping module may alone or function in tandem with one or more other modules to first filter out one or more rows that are not compatible with the instance being placed to reduce the candidate rows to a smaller set of rows for further determination and identification of the one or more legal rows.

In some embodiments where a legal row is associated or defined with a specific legal orientation, the snapping mechanism may also re-orient the instance to fit the specific legal orientation of the legal row. In some embodiments wherein more than one legal orientation is allowed in a legal row, the snapping module may optionally rotate the instance to better fit the instance within the legal row or to produce a better layout (e.g., a more even spaced or structured layout).

An anchor point in a legal row may be determined for the instance to be placed by the snapping module based on one or more alignment requirements. For example, various rules or requirements may dictate that one or more sets of grids in the instance be aligned with the one or more corresponding sets of grids covered by the row. An anchor point for the instance may thus be identified by considering the instance, the one or more sets of grids in the instance, and the one or more corresponding sets of grids in the legal row so that placing the instance at the anchor point (e.g., by aligning the relative origin of the instance with the anchor point location) results in a legal placement.

When the snapping module snaps an instance or a group of instance, the instance or a group of instance may be aligned in either or both the horizontal direction and the vertical direction while accounting the orientation and/or the rotation of the instance or the group of instance being placed. Moreover, the snapping module may determine the snapping location in the horizontal direction independent of the snapping location in the vertical direction for the instance or the group of instance. For example, when one or more sets of horizontal grids apply to the entire row region in a placement layout, the snapping locations in the horizontal and vertical directions may be determined independent of each other.

In addition or in the alternative, the snapping module may snap an instance or a group of instances to one or more sets of grids (collectively a snap pattern for singular or snap patterns for plural) so long as the snapping module may identify a legal placement for the instance or the group of instance.

In some embodiments where rows are created or defined in the horizontal direction, a snapping module may snap an instance or a group of instance at least by performing the following process. For an instance or a group of instance to be placed into a row region comprising a plurality of rows each corresponding to its own permissible component type (s), a legal row with a permissible component type that matches that of the instance or the group of instance may be identified. The instance or the group of instance may be optionally rotated, if required or desired, to match the legal orientation of the identified legal row for the instance or the group of instance.

An alignment reference side or reference point may be determined from the identified legal row. For example, the identified legal row may be defined to have components aligned to the top, bottom, or center of the identified row for a given component type. It shall be noted that a row may include different alignment reference sides or alignment reference points for different permissible component types. In some of these embodiments, the alignment reference side or alignment reference point may be determined based on the user's input.

The final location to snap the instance of the group of instances may be determined based in part or in whole upon, for example, whether one or more adjacent instances or adjacent groups of instances require or desire a specific alignment with respect to a specific reference (e.g., a specific baseline), whether alignment offsets are required or desired, whether the instance of the group of instances is required to be aligned with respect to one or more sets of grids (e.g., poly grids, finFET grids, M1 grids, M2, grids, etc.), whether specific coloring or multi-exposure requirements apply to the instance of the group of instances, any other required or desired criteria, or any combinations thereof.

In some embodiments where a row region comprises a plurality of rows in the horizontal direction, a snapping module described herein may also snap standard cells as well as custom cells. In snapping a standard cell in, for example, the horizontal direction, a snapping module may determine one or more snap locations for the standard cell based in part or in whole upon one or more criteria. For example, the snapping module may determine whether the standard cell includes or is associated with a site definition (e.g., siteDEF), whether the standard cell includes or is associated with an instance pitch, whether the standard cell includes or is associated with a row site, etc.

In some embodiments where more than one of these criteria are present, a snapping module may determine one or more candidate locations or the final location of a standard cell by prioritizing these criteria. For example, a snapping module may be configured to override the other criteria when a site definition (siteDEF) is present. If the site definition is absent, the snapping module may determine whether an instance pitch is present. If so, the instance pitch may assume priority over the remaining criterion or criteria. Otherwise, the snapping module may reference the row site, if present, over the remaining criterion or criteria. If the site definition, instance pitch, and row site are absent, a snapping module may follow the aforementioned approach to determine the horizontal snap locations.

Computing System Description

Figure 9A:
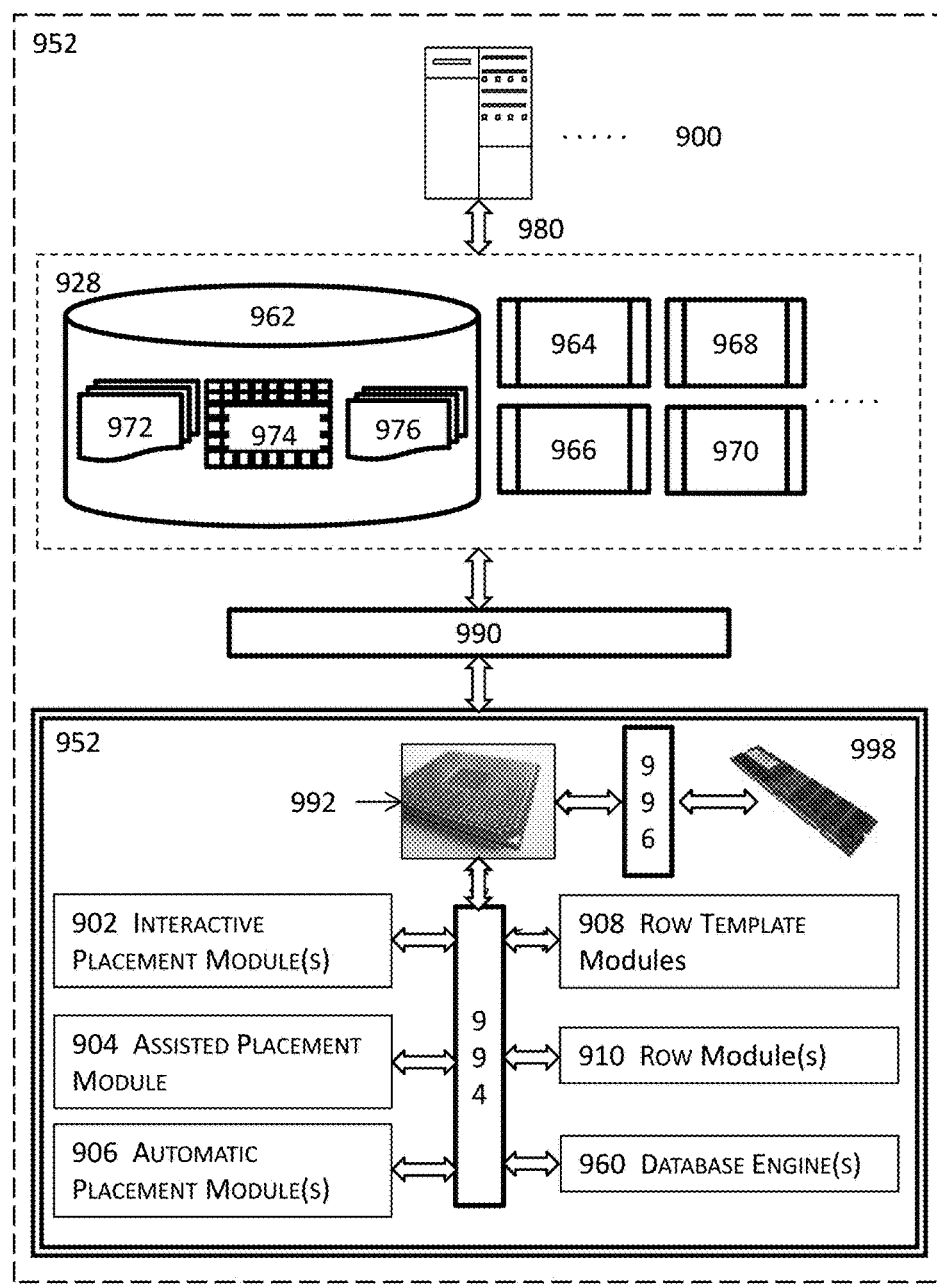
FIG. 9A illustrates a block diagram of a system for implementing placement using row templates for an electronic design using row templates in one or more embodiments.

FIG. 9A illustrates a block diagram of a system for implementing placement using row templates for an electronic design using row templates with snapping in one or more embodiments. More specifically, FIG. 9A illustrates an illustrative high level schematic block diagrams for a system for implementing placement using row templates for an electronic design using row templates and may comprise one or more computing systems 900, such as a general purpose computer described in more detail below configured to perform unique functions described herein to achieve one or more special, intended proposes. The illustrative system in FIG. 9A may include an Internet-based computing platform providing a shared pool of configurable computer processing resources (e.g., computer networks, servers, storage, applications, services, etc.) and data to other computers and devices in an ubiquitous, on-demand basis via the Internet. For example, one or more computing resources and/or modules illustrated in FIG. 9A may be located in a cloud computing platform in some embodiments.

In some embodiments, the one or more computing systems 900 may invoke various system resources such as the processor(s) or processor core(s), memory, disks, etc. The one or more computing systems 900 may also initiate or interact with other computing systems to access, via a computer bus architecture (e.g., a system bus, a control bus, a data bus, or any combinations thereof), various resources 928 that may comprise a floorplanner, a global routing engine, and/or a detail routing engine 964, a layout editor 966, a design rule checker 968, a verification engine 970, etc.

The one or more computing systems 900 may further write to and read from a local or remote non-transitory computer accessible storage 962 that stores thereupon data or information such as, but not limited to, one or more databases (974) such as schematic design database(s) or physical design database(s), electronic circuit design specification database(s), various statistics, various data, rule decks, various design rules, constraints, etc. (972), or other information or data (976) that may be used to facilitate the performance of various functions to achieve the intended purposes.

In some embodiments, the one or more computing systems 900 may include or, either directly or indirectly through the various resources 928, invoke a set of modules 952 including hardware modules and software modules or combinations of one or more hardware modules and one or more software modules that may comprise one or more interactive placement modules 902 that interact with a designer in implementing a placement layout or floorplan. For example, a designer may manually define a region and manually drag an instance to a desired location in the manually defined region in a placement layout or floorplan, and an interactive placement module 902 may determine one or more legal positions in one or more rows in a row region based on where the design drags the instance in order to insert the instance to create a legal placement layout or floorplan.

The set of modules 952 may also include one or more assisted placement modules 904 that assist a designer in placing one or more instances in a placement layout or floorplan. For example, a designer may specify a set of instances to be placed in a region in a placement layout or floorplan. An assisted placement module 904 may identify this set of instances and their respective characteristics, identify one or more row templates, apply the one or more row templates to the region, and determine one or more viable placement options for the set of instances. The set of modules 952 may also include an automatic placement module 906 that automatically place the devices of an electronic design or a portion thereof by automatically determining one or more row regions, identifying one or more row templates, applying the one or more row templates to the one or more row regions, and placing the devices or a portion thereof into corresponding rows in the one or more row regions by using the one or more row templates, without human intervention.

The set of modules 952 may also include one or more row template modules 908 to create, modify, and maintain row templates. The set of modules 952 may also include one or more row modules 910 to create row objects or row references for rows, to modify rows, and to maintain rows. In addition or in the alternative, this set of modules 952 may include one or more database engines 960 that function in tandem with one or more other modules (e.g., a row template module, a row module, one or more placement modules, etc.) to perform various database operations such as database queries, etc.

In some embodiments, the computing system 900 may include the various resources 928 such that these various resources may be invoked from within the computing system via a computer bus 980 (e.g., a data bus interfacing a microprocessor 992 and the non-transitory computer accessible storage medium 998 or a system bus 990 between a microprocessor 992 and one or more engines in the various resources 928). In some other embodiments, some or all of these various resources may be located remotely from the computing system 900 such that the computing system may access the some or all of these resources via a computer bus 980 and one or more network components.

The computing system may also include one or more modules in the set of modules 952. One or more modules in the set 952 may include or at least function in tandem with a microprocessor 992 via a computer bus 994 in some embodiments. In these embodiments, a single microprocessor 992 may be included in and thus shared among more than one module even when the computing system 900 includes only one microprocessor 992. A microprocessor 992 may further access some non-transitory memory 998 (e.g., random access memory or RAM) via a system bus 996 to read and/or write data during the microprocessor's execution of processes.

Figure 9B:
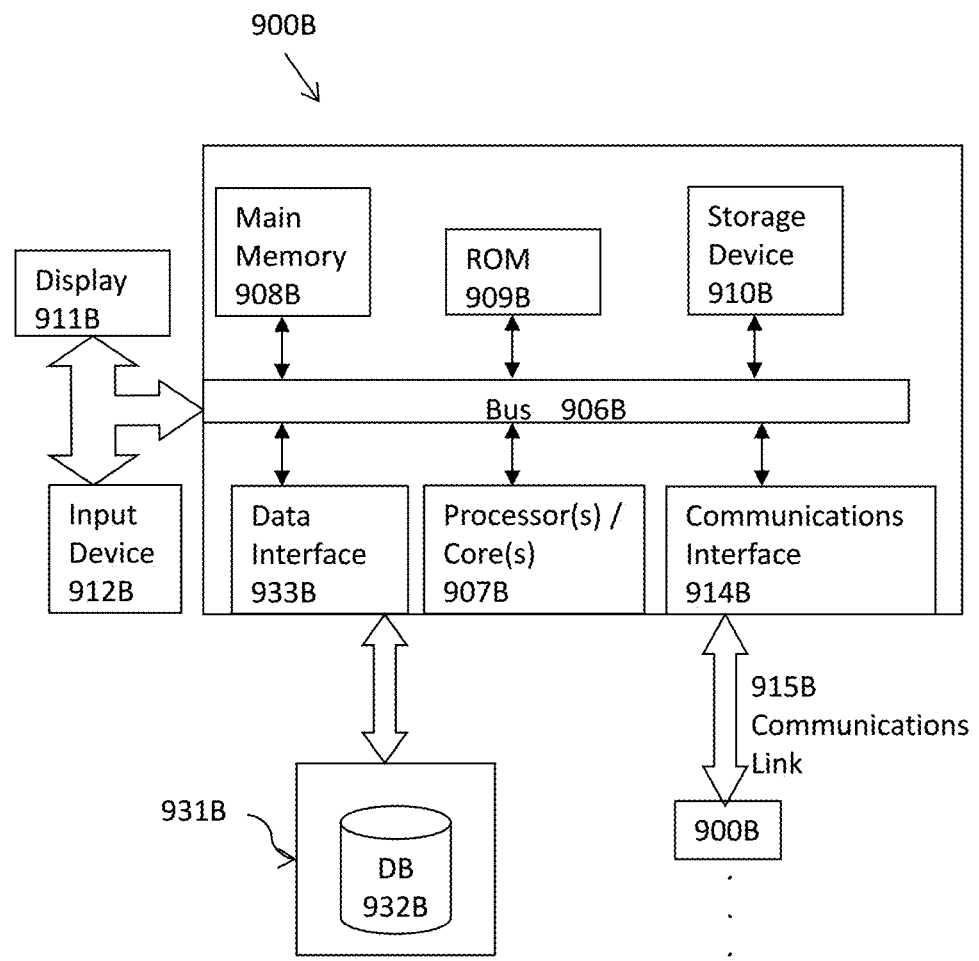
FIG. 9B illustrates a computerized system on which a method for implementing placement using row templates for an electronic design using row templates may be implemented.

FIG. 9B illustrates a computerized system on which a method for implementing placement using row templates for an electronic design using row templates may be implemented as described in the preceding paragraphs with reference to various figures. The illustrative computing system 900B may include an Internet-based computing platform providing a shared pool of configurable computer processing resources (e.g., computer networks, servers, storage, applications, services, etc.) and data to other computers and devices in an ubiquitous, on-demand basis via the Internet. For example, the computing system 900B may include or may be a part of a cloud computing platform in some embodiments. Computer system 900B includes a bus 906B or other communication module for communicating information, which interconnects subsystems and devices, such as processor 907B, system memory 908B (e.g., RAM), static storage device 909B (e.g., ROM), disk drive 910B (e.g., magnetic or optical), communication interface 914B (e.g., modem or Ethernet card), display 911B (e.g., CRT or LCD), input device 912B (e.g., keyboard), and cursor control (not shown).

According to one embodiment, computing system 900B performs specific operations by one or more processor or processor cores 907B executing one or more sequences of one or more instructions contained in system memory 908B. Such instructions may be read into system memory 908B from another computer readable/usable storage medium, such as static storage device 909B or disk drive 910B. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 907B, where the one or more processors, one or more processor cores, or combination thereof executes one or more threads. For example, various acts of identifying, various acts of determining, various acts of classifying, various acts of implementing, various acts of performing, various acts of transforming, various acts of decomposing, various acts of updating, various acts of presenting, various acts of modifying, etc. may be performed by one or more processors, one or more processor cores, or combination thereof.

A modules described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a module described herein may be implemented as an application-specific integrated circuit (ASIC) in some embodiments.

In these embodiments, a module may thus include, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc.

despite the fact that these microprocessor, processor core, and electrical circuitry may nevertheless be shared among a plurality of module. A module described herein or an equivalent thereof may perform its respective functions alone or in conjunction with one or more other modules. A module described herein or an equivalent thereof may thus invoke one or more other modules by, for example, issuing one or more commands or function calls. The invocation of one or more other modules may be fully automated or may involve one or more user inputs.

The term "computer readable storage medium" or "computer usable storage medium" as used herein refers to any non-transitory medium that participates in providing instructions to processor 907B for execution. Such a medium may take many forms, including but not limited to, non-volatile media and volatile media. Non-volatile media includes, for example, optical or magnetic disks, such as disk drive 910B. Volatile media includes dynamic memory, such as system memory 908B. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 900B. According to other embodiments of the invention, two or more computer systems 900B coupled by communication link 915B (e.g., LAN, PTSN, or wireless network) may perform the sequence of instructions required to practice the invention in coordination with one another.

Computer system 900B may transmit and receive messages, data, and instructions, including program, i.e., application code, through communication link 915B and communication interface 914B. Received program code may be executed by processor 907B as it is received, and/or stored in disk drive 910B, or other non-volatile storage for later execution. In an embodiment, the computing system 900B operates in conjunction with a data storage system 931B, e.g., a data storage system 931B that includes a database 932B that is readily accessible by the computing system 900B. The computing system 900B communicates with the data storage system 931B through a data interface 933B. A data interface 933B, which is coupled with the bus 906B, transmits and receives electrical, electromagnetic or optical signals that include data streams representing various types of signal information, e.g., instructions, messages and data. In embodiments of the invention, the functions of the data interface 933B may be performed by the communication interface 914B.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing placement with snapping for an electronic design, comprising:
    receiving an instruction in a graphical user interface to manipulate an object for an electronic design;
    determining, by a microprocessor, a tracking location for the object as the instruction is received for manipulating the object to the tracking location in the graphical user interface;
    identifying a row within a row region and a reference grid for placement of the object;
    snapping the tracking location to a location within the row, wherein the location is aligned with the reference grid at least by correlating the tracking location to the row and the reference grid; and
    configuring a display device to display the object snapped to the location within the row that is aligned to the reference grid.

2. The computer implemented method of claim 1, wherein the row region is selected at least by:
    determining a distance between the tracking location and the row region;
    comparing the distance to a threshold snapping distance; and
    selecting the row region when the distance is less than the threshold snapping distance.

3. The computer implemented method of claim 1, wherein the row is selected at least by:
    determining a distance between the tracking location and one or more rows;
    identifying the row from the one or more rows based at least in part on a component type that matches the object; and
    selecting the row that corresponds to the matching component type and for which the distance is a nearest distance one of the one or more rows.

4. The computer implemented method of claim 1, further comprising determining an orientation for the object, determining the orientation comprising:
    identifying a required orientation for the row;
    identifying a current orientation for the object; and
    performing at least one of object mirroring or object rotation to conform the current orientation of the object to the required orientation for the row.

5. The computer implemented method of claim 1, further comprising performing object alignment for the object, performing the object alignment comprising:
    determining a required alignment configuration for the row having at least one of a top alignment requirement, a center alignment requirement, a bottom alignment requirement, or an alignment offset; and
    aligning the object to match the required alignment configuration for the row.

6. The computer implemented method of claim 5, wherein the object is aligned to match the required alignment configuration for the row to obtain a Y coordinate for the object.

7. The computer implemented method of claim 1, wherein the location within the row that is aligned with the reference grid is identified by:
    determining whether multiple reference grids are applicable to the object;
    aligning the object to a reference grid that is determined to have a largest pitch.

8. The computer implemented method of claim 7, wherein the object is aligned to the reference grid to obtain an X coordinate for the object.

9. A computer program product that includes a non-transitory computer readable medium storing thereupon a plurality of computer instructions which, when executed by a microprocessor, cause the microprocessor to perform a set of acts for implementing placement with snapping for an electronic design, the set of acts comprising:
- receiving an instruction in a graphical user interface to manipulate an object for an electronic design;
- determining, by the microprocessor, a tracking location for the object as the instruction is received for manipulating the object to the tracking location in the graphical user interface;
- identifying a row within a row region and a reference grid for placement of the object;
- snapping the tracking location to a location within the row, wherein the location is aligned with the reference grid at least by correlating the tracking location to the row and the reference grid; and
- configuring a display device to display the object snapped to the location within the row that is aligned to the reference grid.

10. The computer program product of claim 9, wherein the row region is selected at least by:
- determining a distance between the tracking location and the row region;
- comparing the distance to a threshold snapping distance; and
- selecting the row region when the distance is less than the threshold snapping distance.

11. The computer program product of claim 9, wherein the row is selected at least by:
- determining a distance between the tracking location and one or more rows;
- identifying the row from the one or more rows based at least in part upon a component type that matches the object; and
- selecting the row that corresponds to the matching component type and for which the distance is a nearest distance one of the one or more rows.

12. The computer program product of claim 9, the set of acts further comprising determining an orientation for the object, determining the orientation comprising:
- identifying a required orientation for the row;
- identifying a current orientation for the object; and
- performing at least one of object mirroring or object rotation to conform the current orientation of the object to the required orientation for the row.

13. The computer program product of claim 9, the set of acts further comprising performing object alignment, performing the object alignment comprising:
- determining a required alignment configuration for the row having at least one of a top alignment requirement, a center alignment requirement, a bottom alignment requirement, or an alignment offset; and
- aligning the object to match the required alignment configuration for the row.

14. The computer program product of claim 13, wherein the object is aligned to match the required alignment configuration for the row to obtain a Y coordinate for the object.

15. The computer program product of claim 9, wherein the location within the row that is aligned with the reference grid is identified by:
- determining whether multiple reference grids are applicable to the object; and
- aligning the object to a reference grid that is determined to have a largest pitch.

16. The computer program product of claim 15, wherein the object is aligned to the reference grid to obtain an X coordinate for the object.

17. A system for implementing placement with snapping for an electronic design, comprising:
- a microprocessor; and
- a memory for holding programmable code, wherein the programmable code includes instructions which, when executed by the microprocessor, cause the microprocessor at least to:
  - receive an instruction in a graphical user interface to manipulate an object for an electronic design;
  - determine a tracking location for the object as the instruction is received for manipulating the object to the tracking location in the graphical user interface;
  - identify a row within a row region and a reference grid for placement of the object;
  - snap the tracking location to a location within the row, wherein the location is aligned with the reference grid at least by correlating the tracking location to the row and the reference grid; and
  - configure a display device to display the object snapped to the location within the row that is aligned to the reference grid.

18. The system of claim 17, wherein the row region is selected at least by:
- determining a distance between the tracking location and the row region;
- comparing the distance to a threshold snapping distance; and
- selecting the row region when the distance is less than the threshold snapping distance.

19. The system of claim 17, wherein the row is selected at least by:
- determining a distance between the tracking location and one or more rows;
- identifying the row from the one or more rows based at least in part upon a component type that matches the object; and
- selecting the row that corresponds to the matching component type and for which the distance is a nearest distance one of the one or more rows.

20. The system of claim 17, the programmable code further comprising the instructions which, when executed by the microprocessor, cause the microprocessor to determine an orientation for the object, wherein the instructions, when executed by the microprocessor, further cause the microprocessor to:
- identify a required orientation for the row;
- identify a current orientation for the object; and
- perform at least one of object mirroring or object rotation to conform the current orientation of the object to the required orientation for the row.

21. The system of claim 17, the programmable code further comprising the instructions which, when executed by the microprocessor, cause the microprocessor to perform object alignment, wherein the instructions, when executed by the microprocessor, further cause the microprocessor to:
- determine a required alignment configuration for the row having at least one of a top alignment requirement, a center alignment requirement, a bottom alignment requirement, or an alignment offset; and
- align the object to match the required alignment configuration for the row.

22. The system of claim 17, wherein the location within the row that is aligned with the reference grid is identified at least by:

determining whether multiple reference grids are applicable to the object;

identifying which of the multiple reference grids has a largest pitch; and aligning the object to the reference grid having the largest pitch.

* * * * *